United States Patent [19]

Brees et al.

[11] Patent Number: 5,082,181
[45] Date of Patent: Jan. 21, 1992

[54] GAS JET ENGINE NOZZLE

[75] Inventors: Dale W. Brees; Claude W. Engelke; Larry L. Linscheid, all of Wichita, Kans.

[73] Assignee: The Boeing Company, Seattle, Wash.

[21] Appl. No.: 452,008

[22] Filed: Dec. 18, 1989

[51] Int. Cl.$^5$ .................. B64C 15/02; F02K 1/78
[52] U.S. Cl. .................. 239/265.35; 239/265.19; 239/265.37; 60/230
[58] Field of Search ............ 239/265.11, 265.19, 239/265.35, 265.37; 60/230, 232

[56] References Cited

U.S. PATENT DOCUMENTS

| | | | |
|---|---|---|---|
| 3,040,523 | 6/1962 | Price | 239/265.35 X |
| 3,130,544 | 4/1964 | Penza | 239/265.19 |
| 3,581,995 | 6/1971 | Fischer | 239/265.11 X |
| 3,807,639 | 4/1974 | Soligny et al. | 239/265.19 |
| 4,037,405 | 7/1977 | Huenniger et al. | 239/265.37 X |
| 4,088,270 | 5/1978 | Maiden | 60/230 X |
| 4,241,876 | 12/1980 | Pederson | 60/230 X |
| 4,537,026 | 8/1985 | Nightingale | 239/265.19 X |
| 4,802,629 | 2/1989 | Klees | 239/265.19 |

Primary Examiner—Andres Kashnikow
Assistant Examiner—William Grant
Attorney, Agent, or Firm—Stephen T. Sullivan

[57] ABSTRACT

A gas jet engine nozzle such as a turbine engine nozzle is provided for directing an axial flow in a downstream direction of exhaust gases to obtain thrust vectoring. The gas jet engine nozzle comprises an exhaust nozzle member for channeling the axial flow of the exhaust gases into a flow field, and a plug movably positioned substantially within the exhaust nozzle member and in the flow field for interacting with the gases to control the direction of flow of the gases. The plug has a substantially continuous surface including a diverging forebody portion and a monotonically converging afterbody portion. The afterbody portion is in the downstream direction relative to the forebody portion. A support structure is coupled to the plug for movably supporting the plug within the exhaust nozzle member and in the flow field. A hydraulic actuating system is operatively coupled to the plug for selectively controlling the position of the plug.

18 Claims, 5 Drawing Sheets

GAS JET ENGINE NOZZLE

BACKGROUND OF THE INVENTION

1. Field of the Invention

The present invention relates to an improved gas jet engine nozzle and, more specifically, to an improved gas jet engine nozzle such as a turbine engine nozzle having thrust vectoring in a plurality of component directions of a rectilinear coordinate system.

2. Description of the Related Art

Conventional gas jet engine nozzles such as turbine engine nozzles generate thrust only in a single direction, along a line or longitudinal axis passing through the engine parallel to the axial flow of gases exhausted from the engine. Vectoring of the vehicle supporting the engine in geometric planes perpendicular to the longitudinal axis of the engine (pitch and yaw planes) generally requires means external to the engine, such as the control surfaces of an aircraft. The external control means add weight to the vehicle and generally result in relatively slow and inefficient control. Such external control means can be augmented or replaced, however, by an engine that includes a nozzle with thrust vectoring capability.

Prior attempts to develop a thrust vectored turbine engine are known. For example, these attempts have included engine designs having ducting arrangements which vent exhaust gases non-longitudinally and asymmetrically through vents to create thrust components normal to the longitudinal axis of the engine. These designs are limited in that they generally add significantly to engine weight and airplane drag. Such vectoring causes significant losses of efficiency in total engine thrust. Furthermore, these designs cause considerable mechanical shock and vibration forces on the vehicle, and relatively small and continuous changes in pitch and yaw thrust components are generally not attainable.

Prior attempts also have included designs in which vanes mounted external to the engine exhaust are used to divert exhaust gas flow to obtain pitch and yaw components. These designs are also limited in that they result in significant additions to engine weight, increased inefficiency, and undesirable mechanical shock and vibration.

OBJECTS OF THE INVENTION

Accordingly, an object of the present invention is to provide an improved gas jet engine nozzle capable of creating thrust in a plurality of component directions simultaneously.

Another object of the invention is to provide an improved gas jet engine nozzle having multi-directional thrust vectoring and relatively low weight.

Another object of the invention is to provide an improved gas jet engine nozzle having multi-directional thrust vectoring and relatively high efficiency.

Still another object of the invention is to provide an improved gas jet engine nozzle that can generate relatively small and continuous changes in pitch and yaw plane vectoring.

Additional objects and advantages of the invention will be set forth in the description which follows, and in part will be apparent from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described in this document, a gas jet engine nozzle for directing an axial flow in a downstream direction of exhaust gases to obtain thrust vectoring is provided that comprises an exhaust nozzle member, flow directing means, support means, and actuating means. The exhaust nozzle member channels the axial flow of exhaust gases into a flow field. The flow directing means is movably positioned substantially within the exhaust nozzle member and in the flow field, and interacts with the gases to control the direction of the flow of the gases. The flow directing means has a substantially continuous surface including a diverging forebody portion and a converging afterbody portion. The afterbody portion is in the downstream direction relative to the forebody portion. The support means are coupled to the flow directing means and movably support the flow directing means within the exhaust nozzle member and in the flow field. The actuating means are operatively coupled to the flow directing means and selectively control the position of the flow directing means.

The forebody portion of the flow directing means preferably has a shape which causes the gases to flow substantially symmetrically about a region of the forebody portion for a plurality of positions of the flow directing means. For example, a section of the forebody portion preferably has a shape corresponding to a section of a sphere. The afterbody portion preferably has a shape which is symmetrical about an afterbody axis. The afterbody portion therefore preferably causes the gases to flow substantially symmetrically about the flow directing means when the afterbody axis is aligned with the axial flow. The afterbody portion causes the gases to flow substantially asymmetrically about the flow directing means, however, when the afterbody axis is misaligned with respect to the axial flow. Preferably, the shape of the afterbody portion converges monotonically as a function of distance along the afterbody axis from the forebody portion. For example, the afterbody portion may have a substantially conical shape.

The flow directing means preferably includes pivoting means for movably coupling the flow directing means to the support means so that the flow directing means pivots about a pivot region relative to the support means. The pivoting means preferably comprises a first pair of opposing, parallel bearing plate supports rigidly coupled to the flow directing means, a second pair of opposing, parallel bearing plate supports positioned substantially perpendicularly to the first pair of bearing plate supports and rigidly coupled to the support means, and a dual axle member having two mutually-perpendicular axles rigidly coupled to one another at a center portion of each of the axles, each of the axles being rotatably coupled to one of the first and the second pairs of bearing plate supports.

The support means may include an internal support structure rigidly positioned relative to the exhaust nozzle member and a rigid elongated member rigidly coupled at one end to the internal support structure and movably coupled at another end to the flow directing means, for example, at the pivoting means. The support means also preferably includes a shroud fairing rigidly coupled to the elongated member and slidably contacting a section of the forebody portion for transitioning the gases in the flow field to the forebody portion.

The actuating means preferably comprises at least one hydraulic actuator coupled to the flow directing means and to the support means for selectively moving the flow directing means relative to the support means.

In a second preferred embodiment of the invention, an improved gas jet engine thrust vectoring nozzle further includes nozzle extension means slidably contacting the exhaust nozzle member for selectively projecting an extended surface contiguous with the exhaust nozzle member to direct the gases toward the flow directing means. The nozzle extension means preferably comprises a substantially spherical segment. The nozzle extension means preferably includes coupling means for selectively projecting the extended surface in response to movements of the flow directing means. The coupling means may, for example, include a plurality of struts rigidly coupled to the flow directing means and to the extended surface.

BRIEF DESCRIPTION OF THE DRAWINGS

The accompany drawings, which are incorporated in and constitute a part of the specification, illustrate presently preferred embodiments of the invention and, together with the general description given above, serve to explain the principles of the invention. Of the drawings:

FIGS. 10A-C show views of a movable surface and the plug of FIGS. 8 and 9 isolated from exhaust nozzle member, in which FIG. 10A shows a perspective view, FIG. 10B shows a side view, and FIG. 10C shows an end or axial view.

DETAILED DESCRIPTION OF THE PREFERRED EMBODIMENTS

Figure 1:
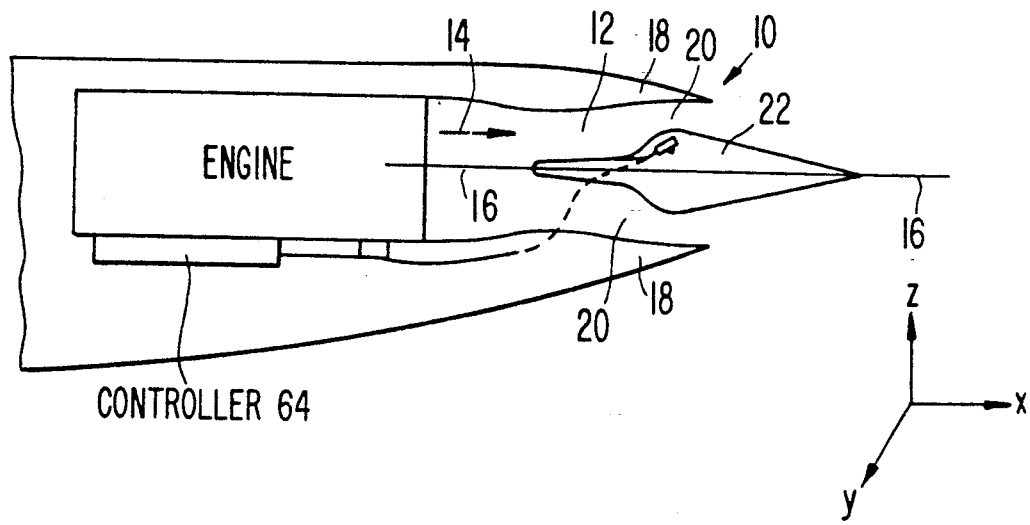
FIG. 1 is a side view of an aircraft turbine engine that incorporates an improved turbine engine thrust vectoring nozzle according to a first preferred embodiment of the invention.

Reference will now be made in detail to the presently preferred embodiments of the invention as illustrated in the accompanying drawings, wherein like reference characters designate like or corresponding parts throughout the several drawings.

FIG. 1 shows a plan view of an aircraft turbine engine into which a turbine engine nozzle 10 according to a first preferred embodiment of the invention is incorporated or to which the nozzle is connected. Air enters the engine at an upstream inlet region (not shown), it is compressed, mixed with fuel, and combusted. The gases comprising the combustion products are exhausted out of the engine at a downstream exhaust region 12 of the engine. The downstream direction is indicated by an arrow 14. Gas flow at exhaust region 12 of the engine is essentially axial along a longitudinal axis 16 of the engine. Longitudinal axis 16 extends down the center of the engine from the inlet region through exhaust region 12.

Figure 2:
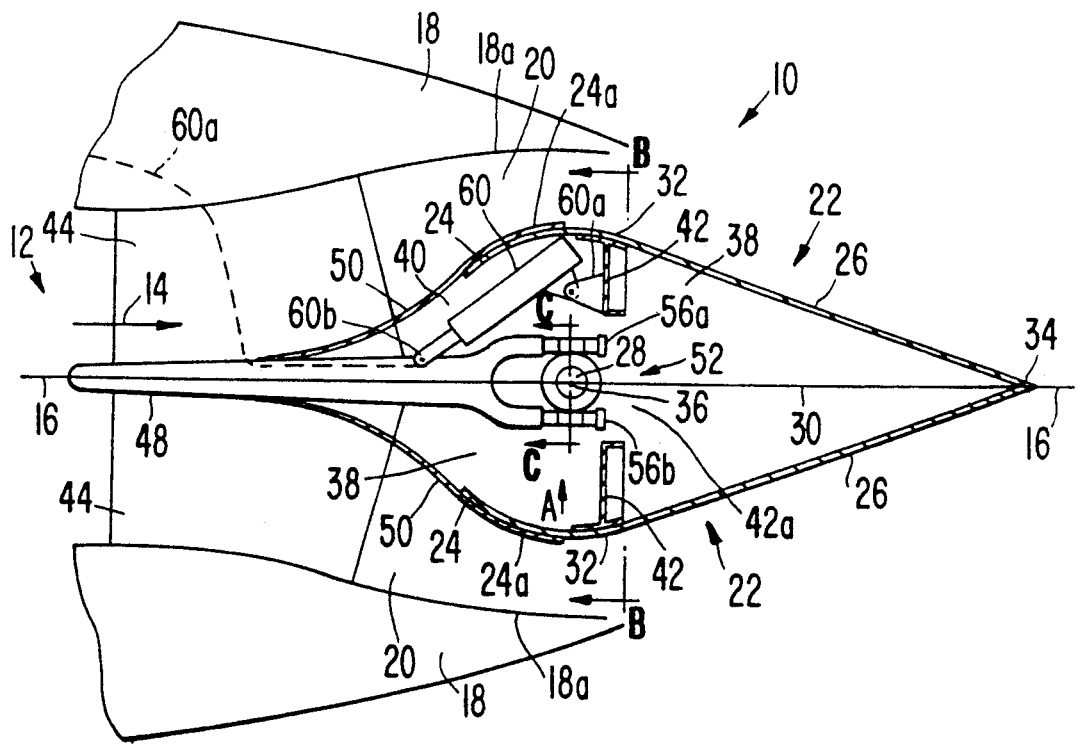
FIG. 2 is a plan view of the turbine engine nozzle of FIG. 1 showing a plug device in an axial position.
Figure 3:
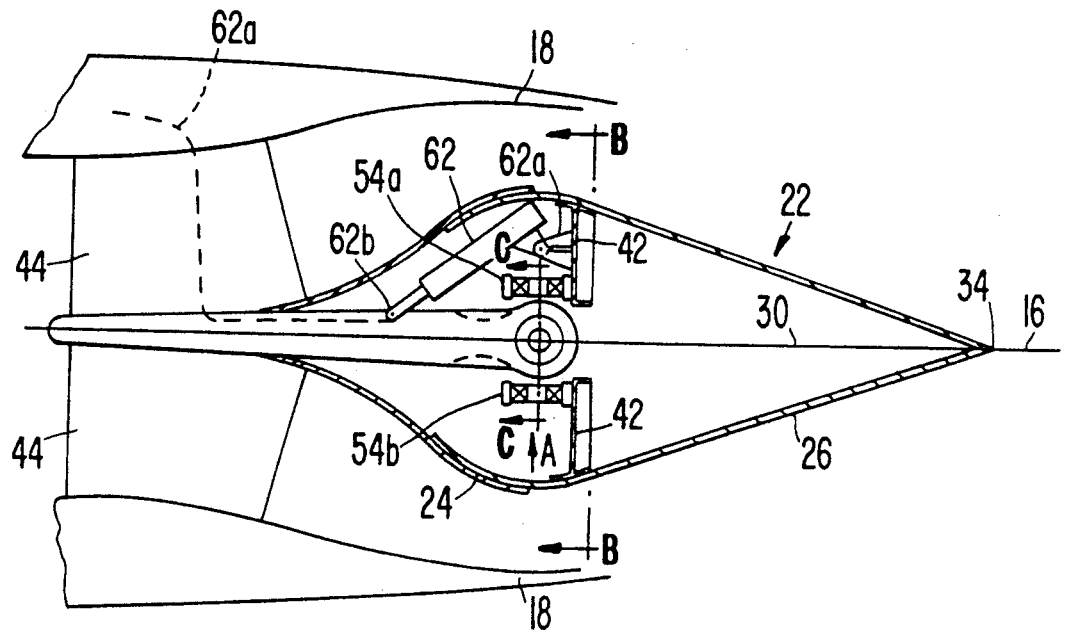
FIG. 3 is a side view of the turbine engine nozzle of FIGS. 1 and 2 showing the plug in the axial position.

A rectilinear coordinate system is shown at the lower right portion of FIG. 1, and provides a reference frame for the description of the preferred embodiments. The x axis corresponds to longitudinal axis 16, the y axis is normal to the plane of the drawing sheet, and the z axis lies in the plane of the drawing sheet. The x and y axes define a yaw plane that extends perpendicularly to the plane of the drawing sheet. The x and z axes define a pitch plane that lies in the plane of the drawing. FIG. 2 shows a top plan view (along the z axis) and FIG. 3 shows a side view (along the y axis) of turbine engine nozzle 10 of the first preferred embodiment.

In accordance with the present invention, the gas jet engine nozzle includes an exhaust nozzle member for channeling the axial flow of the exhaust gases into a flow field. As embodied herein, turbine engine nozzle 10 includes an exhaust nozzle member 18 positioned substantially symmetrically about longitudinal axis 16 for channeling the axial flow of the exhaust gases into an exhaust gas flow field 20. The exhaust nozzle member may correspond to known designs of an exhaust nozzle portion of a conventional aircraft turbine engine.

Further in accordance with the present invention, the gas jet engine nozzle also includes flow directing means movably positioned substantially within the exhaust nozzle member and in the flow field for interacting with the gases to control the direction of flow of the gases. As embodied herein, turbine engine nozzle 10 also includes flow directing means movably positioned substantially within exhaust nozzle member 18 and in flow field 20 for interacting with the gases to control the direction of flow of the gases. The flow directing means has a substantially continuous surface including a diverging forebody portion and a converging afterbody portion. The afterbody portion is in the downstream direction relative to the forebody portion.

As specifically embodied in the first preferred embodiment, and with initial reference to FIG. 2, the flow directing means comprises a plug 22 having a forebody portion 24 and an afterbody portion 26. Plug 22 is movably mounted in an annular region of engine nozzle member 18 and constitutes a three-dimensional geometric body in flow field 20 that selectively varies the symmetry of the gas flow in the flow field. Plug 22 is movable about a pivot point 28 so that it can assume an axial position as shown in FIGS. 1-3, or non-axial positions such as those shown in FIGS. 4 and 5. When plug 22 is in the axial position, exhaust gases flow substantially symmetrically around plug 22 and thus cause the engine to produce only longitudinal thrust. When plug 22 assumes non-axial positions, the flow pattern of exhaust gases is changed to a non-axial, asymmetric flow pattern. Plug 22 can thus selectively change the direction of flow of exhaust gases and correspondingly change the direction of thrust. Accordingly, a variety of geometric configurations for plug 22 are possible.

Forebody portion 24 transitions the flow to the annular region between plug 22 and an interior wall 18a of exhaust nozzle member 18. Forebody portion 24 has a shape that causes gases exiting engine nozzle 10 to flow substantially symmetrically about a region of the forebody portion for a plurality of positions of plug 22 in flow field 20, including the axial position and non-axial positions. Preferably, a section 24a of forebody portion 24 has a shape corresponding to a section of a sphere.

Afterbody portion 26 is the principal element of the flow directing means responsible for selectively varying the symmetry of exhaust gas flow in the flow field. Afterbody portion 26 preferably has a shape that is symmetrical about an afterbody axis 30, and which converges monotonically as a function of distance along afterbody axis 30 from forebody portion 24. This shape is selected to cause the exhausted gases to flow substantially symmetrically about a region of plug 22 when the plug is in the axial position, i.e., when afterbody axis 30 is aligned with the axial flow along longitudinal axis 16, and to cause the gases to flow substantially asymmetrically about a region of plug 22 for non-axial positions of plug 22, i.e., when afterbody axis 30 is misaligned with respect to axial flow along longitudinal axis 16, thus influencing the symmetry of thrust produced by the engine.

The size and shape of afterbody portion 26 are fixed but, for a particular design, the size and shape are influenced by the flow regime. For a given exhaust nozzle design and flow regime, afterbody portion 26 is shaped to selectively and controllably create asymmetries of flow along plug 22 for non-axial positions, which creates corresponding pressure differentials across the plug and thereby produces thrust components normal to longitudinal axis 16, e.g., in the pitch and yaw planes. The flow asymmetries are created in relation to the diversion of afterbody portion 26 from the axial position. The size and shape of afterbody portion 26 are also influenced by the objective of reducing or eliminating boundary layer separation at afterbody portion 26.

Figure 4:
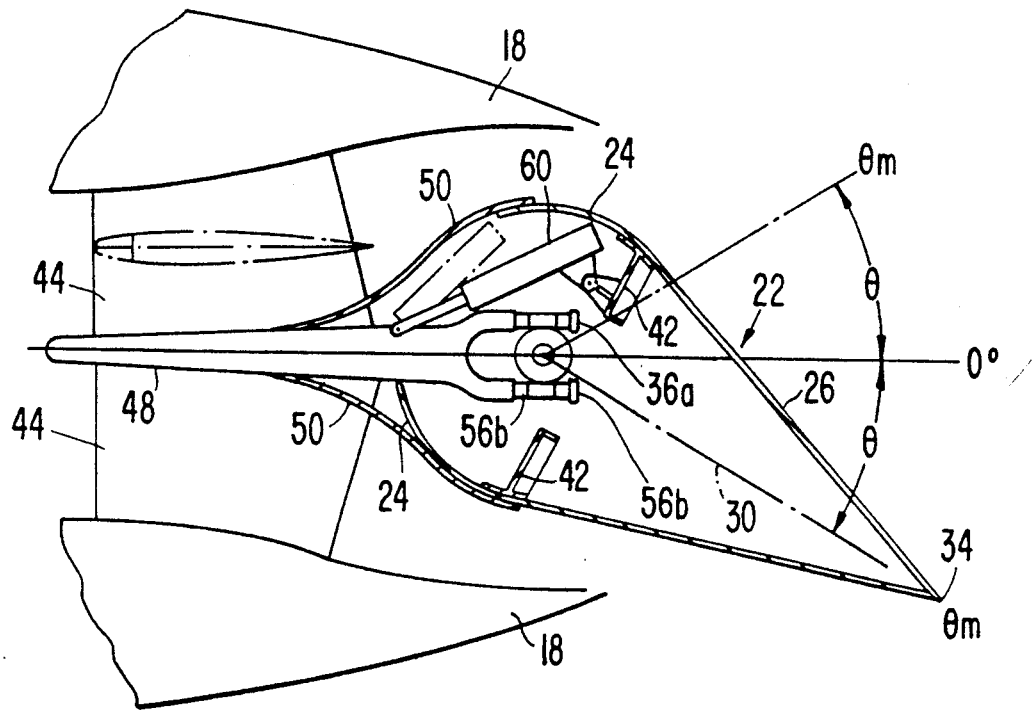
FIG. 4 is a plan view of the turbine engine nozzle of FIGS. 1-3 showing the plug in a non-axial position.
Figure 5:
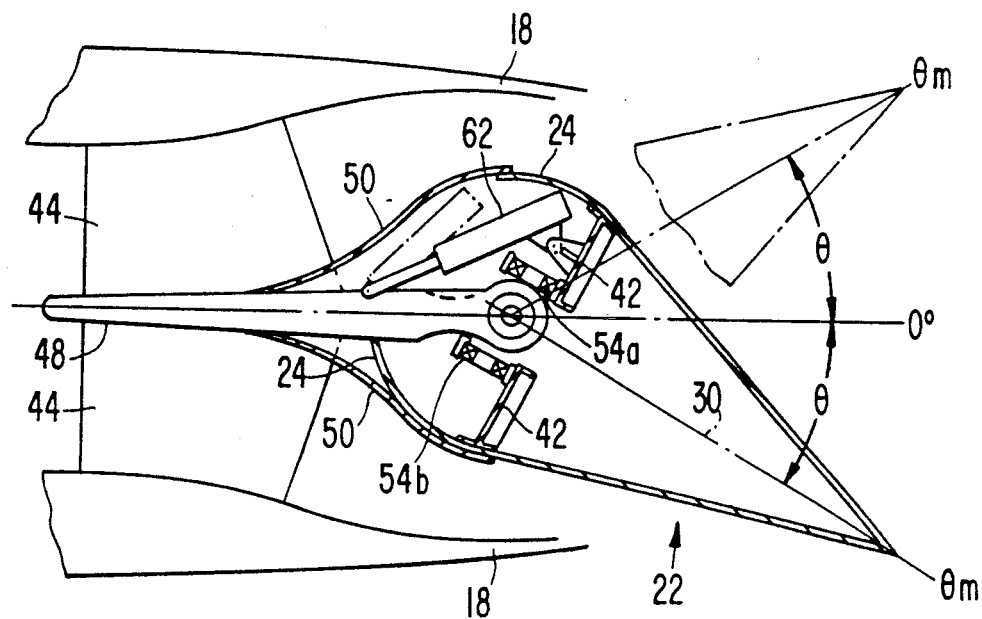
FIG. 5 is a side view of the turbine engine nozzle of FIGS. 1-4 showing the plug in a non-axial position.

Afterbody portion 26 of the first preferred embodiment has a substantially conical shape. A base region 32 is contiguous with and forms an intersection, a continuous surface, with forebody portion 24. An apex region 34 is positioned in the downstream direction relative to base region 32. Afterbody axis 30 extends from pivot point 28 longitudinally down the center of conical afterbody portion 26 and passes through the center of base region 32 and apex region 34. Forebody portion 24 is coupled to afterbody portion 26 at base region 32 so that afterbody axis 30 extends from pivot region 28 at the center of the spherical section of forebody portion 24. As shown in FIGS. 4 and 5, afterbody axis 30 can move in two angular dimensions, corresponding to the pitch and yaw planes, at angles $\phi$, ranging from 0° (axial position) to a maximum angle $\phi_m$.

The optimal size of plug 22 as a whole is influenced by a number of factors and will vary depending on the specific application. The factors include the inner diameter of exhaust nozzle member 18, the ranges of exhaust gas velocities and flow rates, the ranges of temperature and viscosity of the gases, the exhaust gas flow regime in the flow field, and maximum desired non-longitudinal thrust. The determination of optimal plug sizing for a particular application can be made based on these and possibly other criteria in accordance with known principles of aerodynamics.

The selection of materials with which to construct plug 22 will depend on the mechanical and thermal demands placed on the plug by the environment in which the plug will operate for a given application. Suitable materials for the plug might include metal or metal alloy materials or composites. Coatings or laminates might be used on the plug surface, for example, to control ablation and selectively reduce drag.

Plug 22 is hollow and includes an internal cavity 38 to accommodate mounting and control elements as described below. An aperture 40 is provided in forebody portion 24, also to accommodate mounting and control elements. The size of forebody aperture 40 is selected to be compatible with the desired range of movement of plug 22. An internal wall 42 is provided in internal cavity 38. Internal wall 42 is rigidly coupled to the interior of plug 22 at and parallel to base region 32. Interior wall 42 includes an aperture 42a centered at pivot point 28.

Further in accordance with the invention, the gas jet engine nozzle also includes support means coupled to the flow directing means for movably supporting the flow directing means within the exhaust nozzle member and in the flow field. As embodied herein, the support means preferably includes an internal support structure rigidly positioned relative to exhaust nozzle member 18 and a rigid elongated member rigidly coupled at one end to the internal support structure and movably coupled at another end to the flow directing means.

Figure 6:
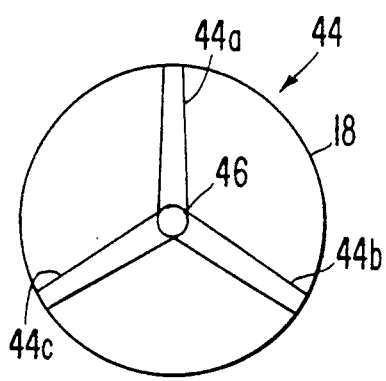
FIG. 6 shows an internal engine support member for supporting the plug of FIGS. 1-5.

The internal support structure preferably comprises an internal sting mount support member 44 shown individually in FIG. 6. Support member 44 includes three support arms 44a-c equally spaced from one another, but can include four or more support arms or struts. Each support arm is rigidly coupled at one end to structural supports on the inside wall of exhaust nozzle member 18. The other end of each of the support arms is rigidly coupled to a joint member 46 positioned at the center of engine exhaust region 12 along longitudinal axis 16 and, thus, at the center of the axial exhaust gas flow.

The rigid, elongated member preferably comprises a cantilevered member such as a hollow sting mount 48 fixedly coupled at a first, upstream end to joint member 46 and extending longitudinally along longitudinal axis 16 parallel to the axial exhaust gas flow in flow field 20. The second, downstream end of sting mount 48 extends through forebody aperture 40 into cavity 38 of plug 22, and is movably coupled to plug 22 as described below. Sting mount 48 preferably is hollow to accommodate the actuating means as described below, and can be used to channel air, for example, for cooling internal components of plug 22 and the actuating means.

A shroud fairing 50 is rigidly coupled t the elongated member and slidably contacts a section of forebody portion 24 for transitioning the gases in the flow field to plug 22. In the first preferred embodiment, shroud fairing 50 is rigidly mounted to sting mount 48 to shield forebody aperture 40 from exhaust gases. A portion of shroud fairing 50 adjacent to sting mount 48 is tapered along longitudinal axis 16 to provide a suitable geometric transition to direct gas flow around forebody portion 24. The portion of shroud fairing 50 adjacent to forebody portion 24 conforms to the spherical shape of forebody portion 24 but has a slightly larger radius of curvature to allow shroud faring 50 to overlap and slidably contact the exterior surface of forebody portion 24.

The flow directing means of the first preferred embodiment includes pivoting means for movably coupling the flow directing means to the support means so that the flow directing means pivots about a pivot region, here pivot point 28, relative to the support means. The pivoting means preferably comprises a universal pivot mechanism 52, mounted to the second end of sting mount 48 to movably couple plug 22 to the engine while allowing apex region 34 of plug 22 to move in the two angular dimensions corresponding to the pitch and yaw planes. The pivoting means includes a first pair of opposing, parallel bearing plate supports 54a-b rigidly coupled to the flow directing means, a second pair of opposing, parallel bearing plate supports 56a-b positioned substantially perpendicularly to the first pair of bearing plate supports and rigidly coupled to the support means, and a dual axle member 58 (FIG. 7C) having two mutually-perpendicular axles 58a-b rigidly coupled to one another at a center portion 58c of each of the axles. Each of the axles is rotatably coupled to one of the first and the second pairs of bearing plate supports. Bearing plate supports 54a-b are rigidly coupled to internal wall 42 of plug 22 as shown in FIGS. 3 and 5. Bearing plate supports 56a-b are rigidly coupled to the second end of sting mount 48, as shown in FIGS. 2 and 4. Each of the plates includes a bearing assembly and axle housing 58d (FIG. 7A) into which a cylindrical end of a corresponding one of the axles of dual axle member 58 is seated.

Figure 7A:
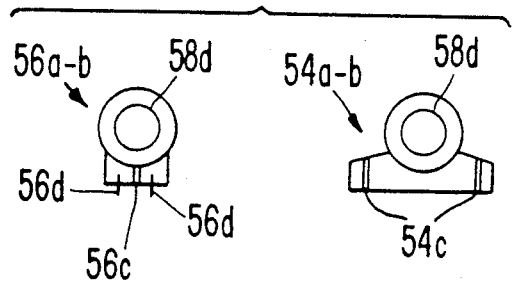
FIG. 7A shows a bearing plate support that is incorporated into a universal pivot mechanism used to support the plug of FIGS. 1-5.
Figure 7B:
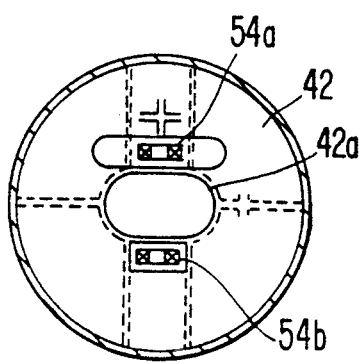
FIG. 7B shows a cross sectional cutaway view of the internal assembly in the plug of FIGS. 1-5 as seen from the perspective indicated by B—B in FIGS. 2 and 3.
Figure 7C:
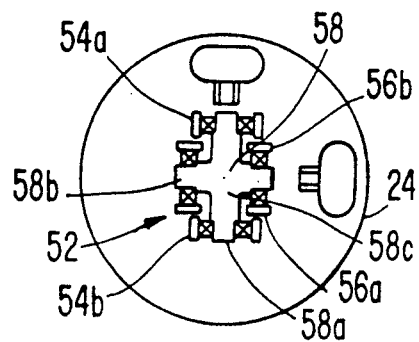
FIG. 7C shows a cross sectional cutaway view of the internal assembly in the plug of FIGS. 1-5 as seen from the perspective indicated by C—C in FIGS. 2 and 3.
Figure 8:
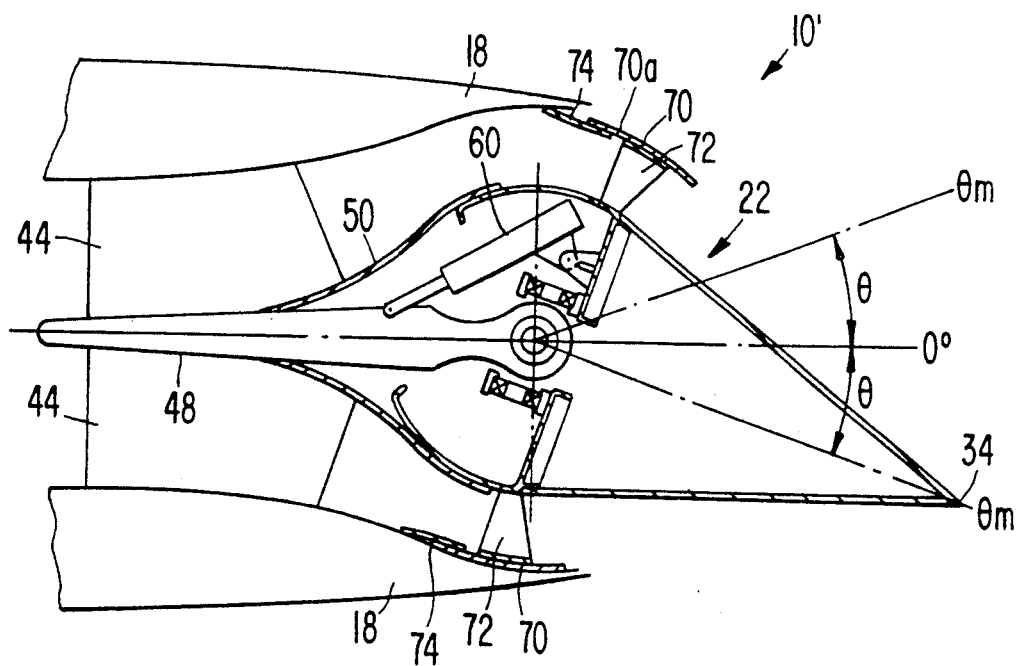
FIG. 8 is a plan view of an improved turbine engine nozzle according to a second preferred embodiment of the invention.
Figure 9:
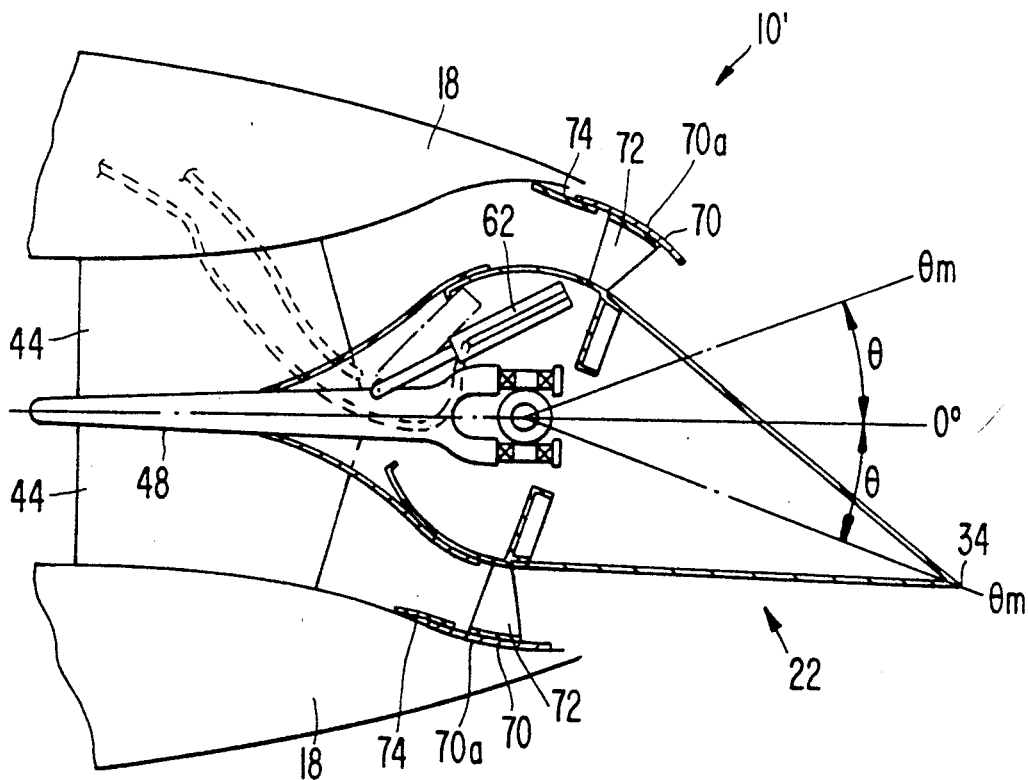
FIG. 9 is a side view of the turbine engine nozzle of FIG. 8.

The left portion of FIG. 7A shows bearing plate supports 56a-b as viewed from a perspective that is parallel to the drawing sheet as indicated by the arrow A in FIG. 2. The right portion of FIG. 7A shows bearing plate supports 54a-b as viewed from a perspective that is parallel to the drawing sheet as indicated by arrow A in FIG. 3. Bolt holes 54c and 56c are provided to secure the respective bearing plate supports to the sting mount and internal wall. Pin supports 56d are provided in bearing plate supports 56a-b to prevent lateral and rotational movement relative to sting mount 48. FIG. 7B shows a cross sectional cutaway view of the internal assembly in plug 22 as viewed along lines B—B, and FIG. 7C shows a cross sectional cutaway view of the internal assembly in plug 22 as viewed along lines C—C.

Universal pivot mechanism 52 allows plug 22 to move about pivot point 28 so that afterbody apex region 34 is independently movable in both the pitch and yaw planes. Given the reference system shown in the lower right portion of FIG. 1, bearing plate supports 54a-b and axle 58a allow movement of plug 22 in the yaw plane, while bearing plate supports 56a-b and axle 58b allow movement of plug 22 in the pitch plane.

Still further in accordance with the invention, the gas jet engine nozzle also includes actuating means operatively coupled to the flow directing means for selectively controlling the position of the flow directing means. As embodied herein, the actuating means preferably comprises at least one hydraulic actuator coupled to the flow directing means and to the support means for selectively moving the flow directing means relative to the support means, although other types of actuating means, such as pneumatic types, may be used.

With reference to FIGS. 2-5, the actuating means of the first preferred embodiment comprises an externally-driven hydraulic actuation system that includes a yaw control hydraulic actuating cylinder 60 and a pitch control hydraulic actuating cylinder 62, each mounted in internal cavity 38 and coupled to plug 22 and sting mount 48 as described below.

Cylinder 60 is rotatably coupled at one end to a yaw actuator hinge 60a which is rigidly, mounted to internal wall 42. The other end of cylinder 60 is movably coupled by a rotational or universal bearing to a bracket 60b on sting mount 48. Hinge 60a and bracket 60b allow rotational movement of the cylinder body and shaft of cylinder 60 relative to the respective points on internal wall 42 and sting mount 48 at which cylinder 60 is coupled. Actuation, i.e., expansion or contraction, of cylinder 60 causes rotation of plug 22 above pivot point 28 in the yaw plane.

Cylinder 62 is rotatably coupled at one end to a pitch actuator hinge 62a which is also rigidly mounted to internal wall 42. The other end of cylinder 62 is movably coupled by a rotational or universal bearing to a bracket 62b on sting mount 48. Hinge 62a and bracket 62b allow rotational movement of the cylinder body and shaft of cylinder 62 relative to the respective points on internal wall 42 and sting mount 48 at which cylinder 62 is coupled. Actuation of cylinder 62 causes rotation of plug 22 about pivot point 28 in the pitch plane.

Cylinders 60 and 62 are coupled to respective hydraulic lines 60c and 62c for driving the cylinders. Hydraulic lines 60c and 62c extend from the respective one of cylinders 60 and 62, into and through a narrow channel in hollow sting mount 48 and one of support member arms 44a-c, and to an hydraulic pump device and controller assembly 64 responsive to external commands, for example, from a pilot or automatic flight controller. The hydraulic pump device is adapted to selectively vary the pressure applied to each of cylinders 60 and 62 to selectively control the position of plug 22 in the pitch and yaw planes. The hydraulic pump of pump and controller assembly 64 may comprise a known design, including an hydraulic fluid and fluid reservoir stored in the aircraft. The pump may, however, employ advanced designs, such as those involving fuel-draulics in which the aircraft fuel is used as the hydraulic fluid.

As an illustrative example, and not by way of limitation, assume that a turbine engine nozzle used with a turbine engine for an aircraft has a diameter at exhaust nozzle member 18 of approximately 0.8 meters, and that the engine exhausts gases at approximately 560° C. at a flow rate of 152 kg/sec. and a velocity of 410 m/sec. In this application, a suitable design for plug 22 would include a diameter at base region 32 of approximately 0.7 m corresponding to a forebody portion radius of 0.035 m, and an afterbody portion axial length (from pivot point 28 to apex region 34) of approximately 1.05 m. The external surface of the illustrated plug would be constructed of 348 stainless steel.

The operation of the first preferred embodiment will now be described. When only longitudinal thrust is commanded, for example, by the pilot or automatic flight controller, pump and controller assembly 64 causes plug 22 to assume an axial position in which afterbody axis 28 is aligned with and parallel to longitudinal axis 16 of the engine, i.e., plug 22 is in the axial position as shown in FIGS. 1-3. When pitch or yaw thrust or both is commanded, the pump and controller assembly 64 actuates cylinders 60 and/or 62 to move or rotate plug 22 about pivot point in accordance with the command to appropriately position plug 22, and particularly afterbody portion 26, in the pitch and/or yaw planes. Plug 22 is moved to a non-axial position for which plug axis 30 is at the desired angle θ with respect to longitudinal axis 16. The angle θ may be selected using pump and controller assembly 64, and may be controlled by flight control parameters for agility maneuvers and flight trim adjustment. A feedback control arrangement may also be used. Movement of plug 22 away from its axial position creates an asymmetry in the exhaust gas flow regime which causes a corresponding imbalance in the pressure force distribution across the plug surface in accordance with known aerodynamics principles. This pressure force imbalance results in a net thrust component in the pitch and/or yaw planes corresponding to the command from pump and controller assembly 64.

A turbine engine nozzle 10, in accordance with a second preferred embodiment of the invention will now be described with reference to FIGS. 8, 9, and 10A-C. The second preferred embodiment is similar to and incorporates many of the features of the first preferred embodiment described above, but further includes nozzle extension means.

The first preferred embodiment of the invention provides significant improvements in thrust vectoring performance relative to conventional turbine engine nozzle designs. Its performance can be further improved, however, by channeling exhaust gas over plug 22 as the plug is moved from the axial position. This directs more gases to the vicinity of plug 22 and retards boundary layer separation from the surface of afterbody portion 26, thus improving the performance of plug 22. The nozzle extension means of the second preferred embodiment serves these purposes.

The nozzle extension means comprises a movable surface 70 that slidably contacts exhaust nozzle member 18 for selectively projecting an extended surface contiguous with exhaust nozzle member 18 to direct the gases toward the flow directing means. The nozzle extension means preferably includes coupling means for selectively projecting the extended surface in response to movements of the flow directing means.

Figure 10A:
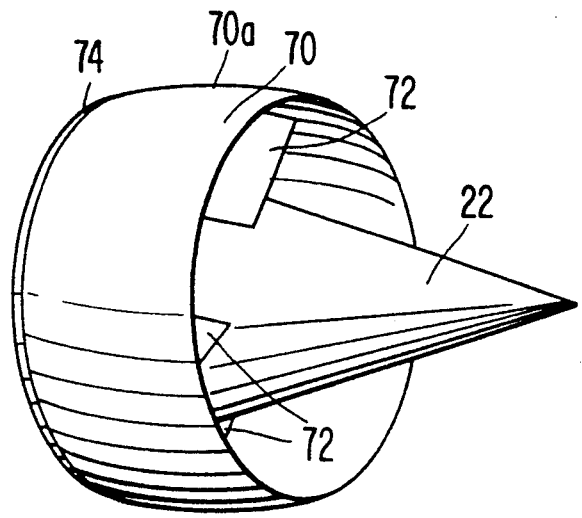
Figure 10B:
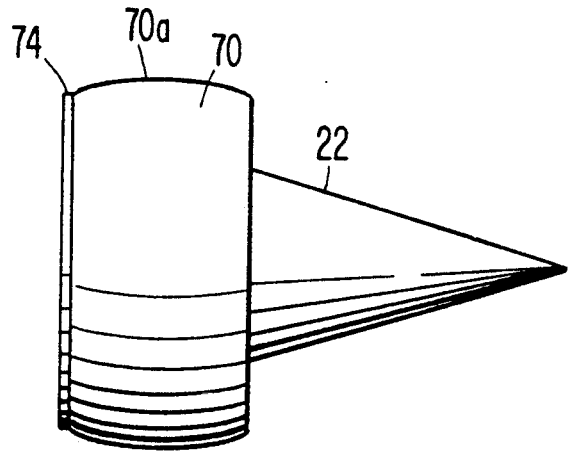
Figure 10C:
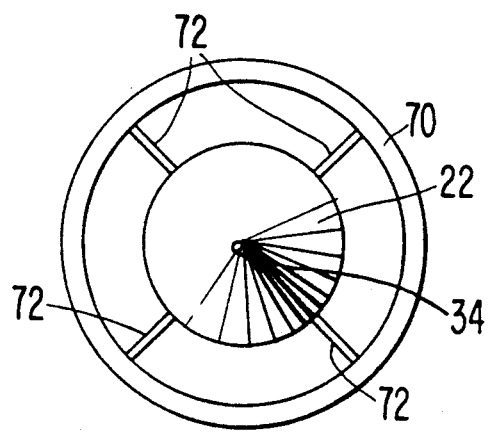

FIGS. 10A-C show views of movable surface 70 and plug 22 detached from sting mount 48 and isolated from exhaust nozzle member 18. FIG. 10A shows a perspective view, FIG. 10B shows a side view, and FIG. 10C shows an end or axial view. As shown in FIGS. 10A-C, movable surface 70 preferably includes a substantially spherical segment 70a the interior walls of which are rigidly coupled to the exterior surface of plug 22 by a plurality of struts 72. Each of the struts is rigidly coupled at one end to plug 22 at or near afterbody portion base region 32, and is coupled at the other end to the interior wall of surface 70. Each of the struts may comprise a planar metallic sheet aligned with its flat or planar surface parallel to longitudinal axis 16 to minimize interruption of exhaust gas flow.

A sliding contact surface 74 is rigidly coupled to the upstream edge of movable surface 70 and slidably contacts interior wall 18a of nozzle member 18. Contact surface 74 acts as a seal to maintain a substantially continuous flow pattern from exhaust nozzle member 18 to surface 70 so that exhaust gases do not pass between exhaust nozzle member 18 and surface 70. The cylindrical length of contact surface 74 and the tension between surface 74 and wall 18a are selected so that surface 74 maintains a substantially continuous surface with interior wall 18a of exhaust nozzle member 18 throughout the range of movement of plug 22, including when the plug is at maximum diversion θm, i.e., apex region 34 is at a maximum distance from longitudinal axis 16.

The operation of the second preferred embodiment is essentially identical to that of the first preferred embodiment except that movement or rotation of plug 22 from the axial position by the actuating means causes a portion 70b of surface 70 to extend, thereby directing the flow of exhaust gases in the direction of apex region 34 of plug afterbody portion 26. More specifically, when plug 22 is in the axial position, the internal walls of surface 70 and contact surface 74 are substantially parallel to longitudinal axis 16, and the engine nozzle operates essentially in a conventional manner to produce only longitudinal thrust. Upon movement of plug 22 to produce pitch and/or yaw thrust components as described above, movement of plug 22 is translated via struts 72 to surface 70, causing surface 70 to rotate with plug 22 and project a portion of the surface to direct exhaust gases closer to afterbody portion 26.

Having now described the presently preferred embodiments of the invention, additional advantages and modifications will readily occur to those skilled in the art. For example, although the preferred embodiments described above are directed to turbine engine nozzles, the invention is applicable to other types of gas jet engine nozzles, such as ramjets, rockets, etc. Accordingly, the invention in its broader aspects is not limited to the specific details, representative apparatus and illustrative examples shown and described. Departures may be made from such details without departing from the spirit or scope of general inventive concept as defined by the appended claims and their equivalents.

What is claimed is:

1. A gas jet engine nozzle for directing an axial flow in a downstream direction along an axis of exhaust gases to obtain thrust vectoring, the engine nozzle comprising:

an exhaust nozzle member for channeling the axial flow of the exhaust gases into a flow field;

flow directing means positioned substantially within the exhaust nozzle member and in the flow field for interacting with the gases to control the direction of flow of the gases, the flow directing means having a substantially continuous surface including a diverging forebody portion and a converging afterbody portion, the afterbody portion being in the downstream direction relative to the forebody portion and including a segment having a substantially conical shape, the flow directing means being pivotally movable so that the afterbody portion moves to nonaxial positions in two dimensions perpendicular to each other and perpendicular to the axis;

support means coupled to the flow directing means for movably supporting the flow directing means within the exhaust nozzle member and in the flow field; and actuating means operatively coupled to the flow directing means for selectively controlling the position of the flow directing means.

2. A gas jet engine nozzle as recited in claim 1, wherein the forebody portion has a shape which causes the gases to flow substantially symmetrically about a region of the forebody portion for a plurality of positions of the flow directing means.

3. A gas jet engine nozzle as recited in claim 1, wherein a section of the forebody portion has a shape corresponding to a section of a sphere.

4. A gas jet engine nozzle as recited in claim 1, wherein the afterbody portion has a shape which is symmetrical about an afterbody axis, the afterbody portion causing the gases to flow substantially symmetrically about the flow directing means when the afterbody axis is aligned with the axis, and the afterbody portion causing the gases to flow substantially asymmetrically about the flow directing means when the afterbody axis is misaligned with respect to the axis.

5. A gas jet engine nozzle as recited in claim 4, wherein the shape of the afterbody portion converges monotonically as a function of distance along the afterbody axis from the forebody portion.

6. A gas jet engine nozzle as recited in claim 1, wherein the afterbody portion has a substantially conical shape and includes a base region contiguous with and forming an intersection with the forebody portion and an apex region positioned in the downstream direction relative to the base region.

7. A gas jet engine nozzle as recited in claim 1, wherein the flow directing means includes pivoting means for movably coupling the flow directing means to the support means so that the flow directing means pivots about a pivot region relative to the support means.

8. A gas jet engine nozzle as recited in claim 7, wherein the pivoting means comprises:
a first pair of opposing, parallel bearing plate supports rigidly coupled to the flow directing means;
a second pair of opposing, parallel bearing plate supports positioned substantially perpendicularly to the first pair of bearing plate supports and rigidly coupled to the support means; and
a dual axle member having two mutually-perpendicular axles rigidly coupled to one another at a center portion of each of the axles, each of the axles being rotatably coupled to one of the first and the second pairs of bearing plate supports.

9. A gas jet engine nozzle as recited in claim 1, wherein the support means includes an internal support structure rigidly positioned relative to the exhaust nozzle member and a rigid elongated member rigidly coupled at one end to the internal support structure and movably coupled at another end to the flow directing means.

10. A gas jet engine nozzle as recited in claim 7, wherein the support means includes an internal support structure rigidly positioned relative to the exhaust nozzle member and a rigid elongated member rigidly coupled at one end to the internal support structure and movably coupled at another end to the pivoting means.

11. A gas jet engine nozzle as recited in claim 9, wherein the support means further includes a shroud fairing rigidly coupled to the elongated member and slidably contacting a section of the forebody portion for transitioning the gases in the flow field to the forebody portion.

12. A gas jet engine nozzle as recited in claim 1, wherein the actuating means comprises at least one hydraulic actuator coupled to the flow directing means and to the support means for selectively moving the flow directing means relative to the support means.

13. A gas jet engine nozzle as recited in claim 1, further including nozzle extension means slidably contacting the exhaust nozzle member and rigidly coupled to the flow directing means for selectively projecting an extended surface contiguous with the exhaust nozzle member to direct the gases toward the flow directing means.

14. A gas jet engine nozzle as recited in claim 13, wherein the nozzle extension means comprises a substantially spherical segment.

15. A gas jet engine nozzle as recited in claim 13, wherein the nozzle extension means includes coupling means for rigidly coupling the nozzle extension means to the flow directing means to project the extended surface outwardly from the exhaust nozzle member in response to movements of the flow directing means.

16. A gas jet engine nozzle as recited in claim 15, wherein the coupling means includes a plurality of struts rigidly coupled to the flow directing means and to the extended surface.

17. A gas jet engine nozzle for directing an axial flow in a downstream direction along an axis of exhaust gases to obtain thrust vectoring, the engine nozzle comprising:
an exhaust nozzle member for channeling the axial flow of the exhaust gases into a flow field;
flow directing means positioned substantially within the exhaust nozzle member and in the flow field for interacting with the gases to control the direction of flow of the gases, the flow directing means having a substantially continuous surface including a diverging forebody portion and a converging afterbody portion, the afterbody portion having a substantially conical shape with a base region contiguous with the forebody portion and an apex region in the downstream direction relative to the base region, the flow directing means being pivotally movable so that the apex region of the afterbody portion moves to nonaxial positions in two dimensions perpendicular to each other and perpendicular to the axis;
support means coupled to the flow directing means for movably supporting the flow directing means within the exhaust nozzle member and in the flow field; and
actuating means operatively coupled to the flow directing means for selectively controlling the position of the flow directing means.

18. A gas jet engine nozzle for directing an axial flow in a downstream direction along an axis of exhaust gases to obtain thrust vectoring in pitch and yaw planes, the engine nozzle comprising:
an exhaust nozzle member for channeling the axial flow of the exhaust gases into a flow field;
flow directing means positioned substantially within the exhaust nozzle member and in the flow field for interacting with the gases to control the direction of flow of the gases, the flow directing means having a substantially continuous surface including a diverging forebody portion and a converging afterbody portion, the afterbody portion including a segment having a substantially conical shape, the flow directing means being rotatably movable so that the afterbody portion moves to nonaxial positions in the pitch and yaw planes;
support means coupled to the flow directing means for movably supporting the flow directing means within the exhaust nozzle member and in the flow field; and
actuating means operatively coupled to the flow directing means for selectively controlling the position of the flow directing means.

* * * * *